Sept. 6, 1966  A. W. LATHAM ETAL  3,271,088
SUPPORTING MEANS FOR BEARING PADS IN A THRUST BEARING ASSEMBLY
Filed May 25, 1964  3 Sheets-Sheet 1

INVENTORS
Albert W. Latham and
Barney Slotnick
BY
ATTORNEY

Sept. 6, 1966   A. W. LATHAM ETAL   3,271,088
SUPPORTING MEANS FOR BEARING PADS IN A THRUST BEARING ASSEMBLY
Filed May 25, 1964   3 Sheets-Sheet 3
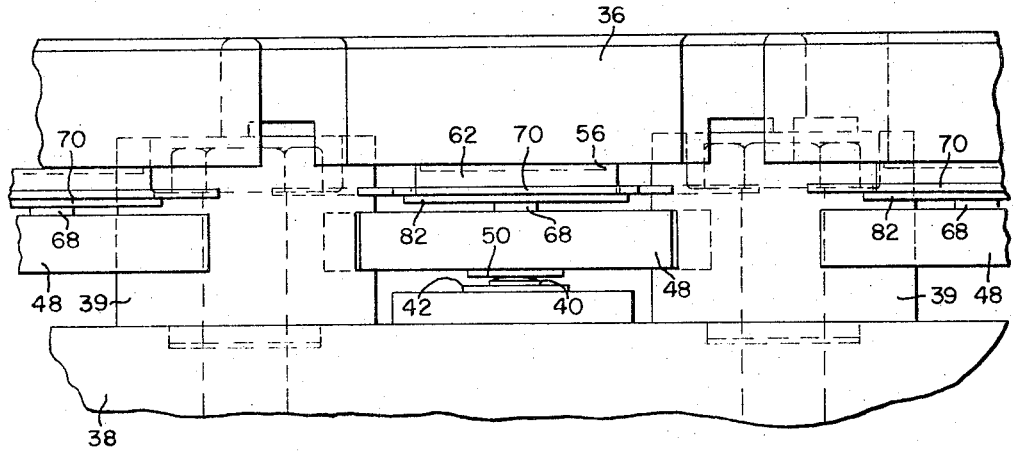
Fig. 3.
Fig. 4.
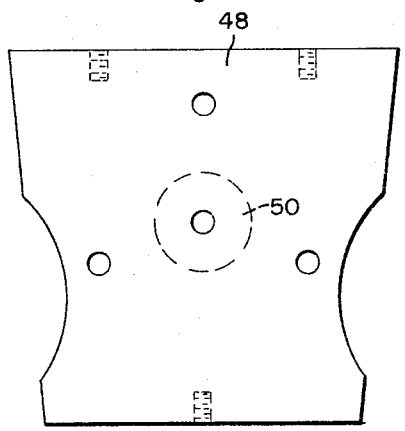

United States Patent Office 3,271,088
Patented Sept. 6, 1966

3,271,088
SUPPORTING MEANS FOR BEARING PADS IN A THRUST BEARING ASSEMBLY
Albert W. Latham, Murrysville, and Barney Slotnick, Irwin, Pa., assignors to Westinghouse Electric Corporation, Pittsburgh, Pa., a corporation of Pennsylvania
Filed May 25, 1964, Ser. No. 369,953
4 Claims. (Cl. 308—160)

The present invention relates to thrust bearing assemblies for vertical shafts, and more particularly to large thrust bearings of the pivoted pad type.

Thrust bearings for vertical shafts of machines such as waterwheel generators provide vertical support for the shaft or the generator rotor at standstill and during shaft or rotor rotation. In one common bearing arrangement, a plurality of bearing pads or shoes are disposed circumferentially about the shaft and a shaft runner is disposed above the bearing pads and supported in lubricated bearing relationship therewith. The pads form arcuate segments of an imaginary flat annular ring about the shaft and are sufficient in number and size to provide efficient support for the total vertical bearing load.

Lubrication of the bearing surfaces is essential since an oil film is needed to control bearing surface temperature rise and to prevent excessive bearing surface wear. During machine start-up and shutdown, a high pressure oil pump can, if desired, be used to inject oil between the bearing surfaces and thereby provide the needed intersurface oil during these operating time periods. When the machine is operating normally, an oil film can be maintained by virtue of inherent characteristics of the bearing design. Thus, in the pivoted pad design, the bearing pads are free to tilt or pivot slightly on a pivot support and about respective radial axes, and a generally wedged shaped oil film is thus produced between the runner and each bearing pad as the runner undergoes rotation. It is also preferable if not essential that each pad be allowed to bend slightly under operating thermal stress along the circumferential direction. Such bending prevents or deters "flush lock-in" of the opposed bearing surfaces since slight edge separation of the bearing surfaces is promoted for wedging oil entry therebetween.

It is preferable that bearing load be distributed substantially uniformly across the surface of each pad so that wear-producing concentrated loading is not applied to any one portion of the bearing surface. With larger pad sizes in larger machines, this goal of uniform load distribution becomes increasingly difficult to achieve especially for the single pivot supported bearing pad. Among other reasons, this is because the larger bearing surface results in bending moments which cause undesired bending of the pad about its pivot and along directions (usually radial) which result in unequal load distribution on the pad surface. This problem of achieving uniformity was highlighted in U.S. Patent 3,018,144 entitled "Thrust Bearing Assembly" filed by R. A. Baudry, and E. C. Whitney on February 29, 1960 and assigned to the present assignee, wherein there was disclosed structure for supporting a bearing pad on its pivot which results in substantially equalized load distribution over the bearing pad surface.

The subject matter of the present disclosure has end mechanical or physical results similar to those provided by the pad supporting structure of U.S. Patent 3,018,144. However, the pad supporting structure of the present disclosure provides improvement in efficiency and economy as compared to the prior pad supporting structure. Thus, in accordance with the principles of the present invention, there is provided in a vertical shaft machine a thrust bearing assembly having a plurality of bearing pads disposed circumferentially about the machine shaft. Each pad is efficiently and economically supported by structure comprising a pivoted spring plate and three spring discs supporting the pad on the spring plate. Preferably, two of the spring discs are disposed along the circumferential reference line radially outwardly of the third spring disc so as to provide for substantially uniform distribution of the bearing load across the surface of the bearing pad.

It is therefore an object of the invention to provide a thrust bearing assembly of the pivoted pad type wherein novel and improved structure supports the bearing pads so as to provide substantially uniform distribution of load over the surface of the pad.

Another object of the invention is to provide a thrust bearing assembly of the pivoted pad type wherein novel structure pivotally supports the bearing pads with improved economy and efficiency.

These and other objects of the invention will become more apparent upon consideration of the following detailed description along with the attached drawings, in which:

FIG. 3 shows an enlarged fragmentary elevational view taken along reference line III—III of FIG. 2 and it shows a thrust bearing pad and supporting structure embodying the invention;

FIG. 4 shows a top plan view of a spring plate included in the structure of FIG. 3; and FIG. 5 shows an enlarged fragmentary elevational view taken along reference line V—V of FIG. 2 and it illustrates the manner in which a disc retaining plate is secured to the spring plate of FIG. 4.

Figure 1:
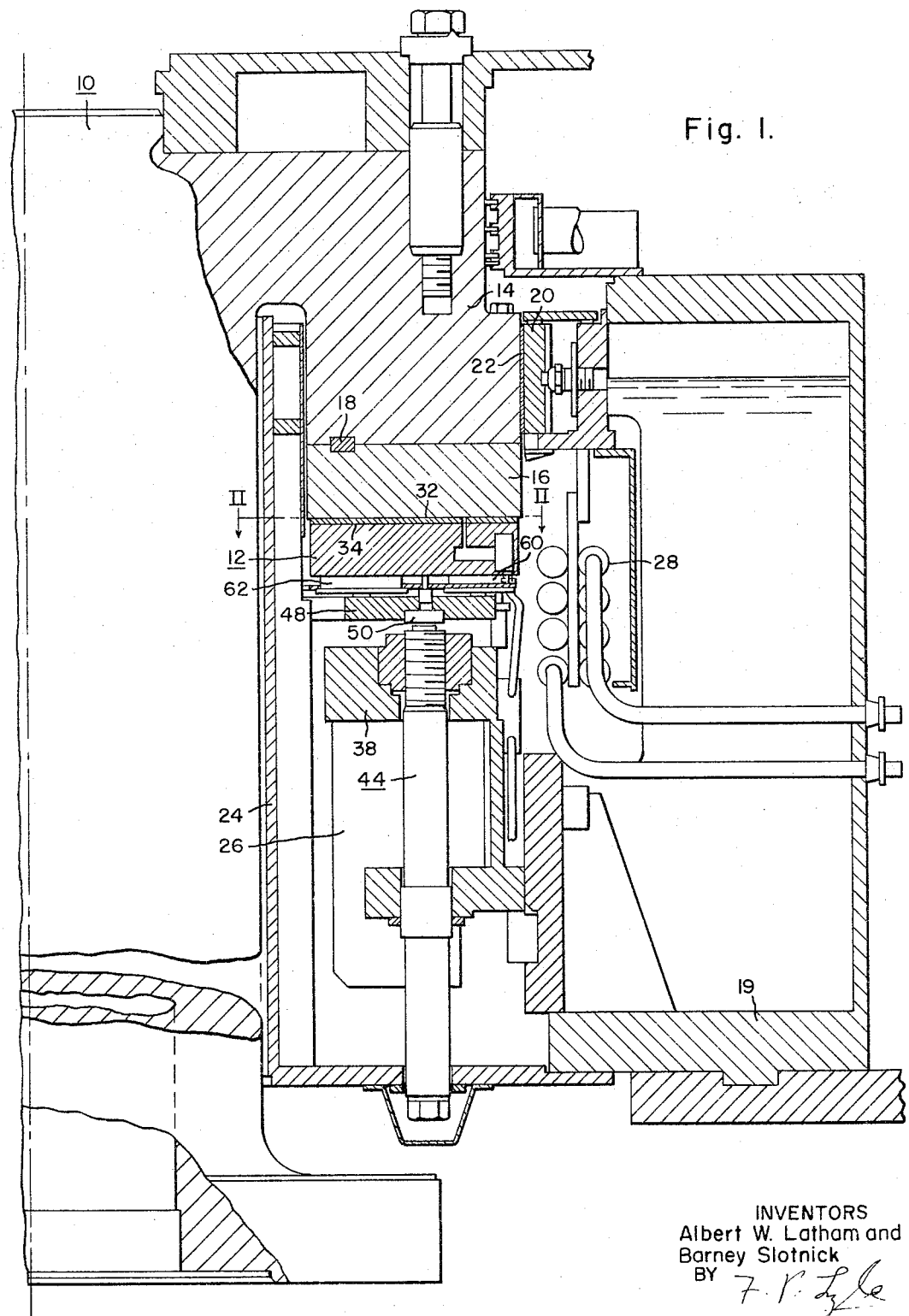
FIGURE 1 shows a vertical sectional view of a large thrust bearing embodying the invention.

More specifically, there is shown in FIG. 1 in illustration of the invention a vertical machine shaft 10 for which there is provided a thrust bearing assembly 12. The shaft 10, which for example can be the shaft of a large waterwheel generator and therein be adapted for connection at its upper end to the generator rotor, carries a thrust block 14 which preferably is integral with the shaft 10 and has an annular thrust runner 16 disposed circumferentially about the shaft 10 and secured to the thrust block 14 by a key 18 or other suitable means so as to rotate with the shaft 10.

The bearing 12 is supported in this instance in an enclosing structure 19 which rests on a foundation (not shown) and which further can support the stator (not shown) of the waterwheel generator. Guide bearing shoes 20 are mounted on the structure 18 circumferentially about the machine shaft 10 and are disposed in bearing relationship with bearing surface 22 on the thrust block 14. A standpipe 24 is secured to the supporting structure 18 about the shaft 10 and thereby forms an annular oil chamber 26 around the bearing 12 so as to provide bearing lubrication. Oil cooling coils 28 of suitable configuration and placement are preferably provided in the oil chamber 26 for the purpose of removing heat from the oil. Further, oil can be pumped through high pressure oil line 30 and injected between bearing surfaces 32 and 34 during the start-up or shutdown period as previously described.

The bearing assembly 12 comprises a plurality of bearing pads 36 each of which is provided with a bearing surface 34 in bearing relationship with the thrust runner bearing surface 32. The bearing pads 36 are disposed circumferentially about the machine shaft 10, and in a large machine it would be normal to expect twelve or more of the pads 36 to be provided. All of the bearing pads 36 in turn are supported on annular bearing support member 38 which is suitably secured to the supporting structure 18. Inserts 39 projecting upwardly from the annular bearing support member 38 prevent rotational displacement of the bearing pads 36 during periods of machine acceleration.

Figure 2:
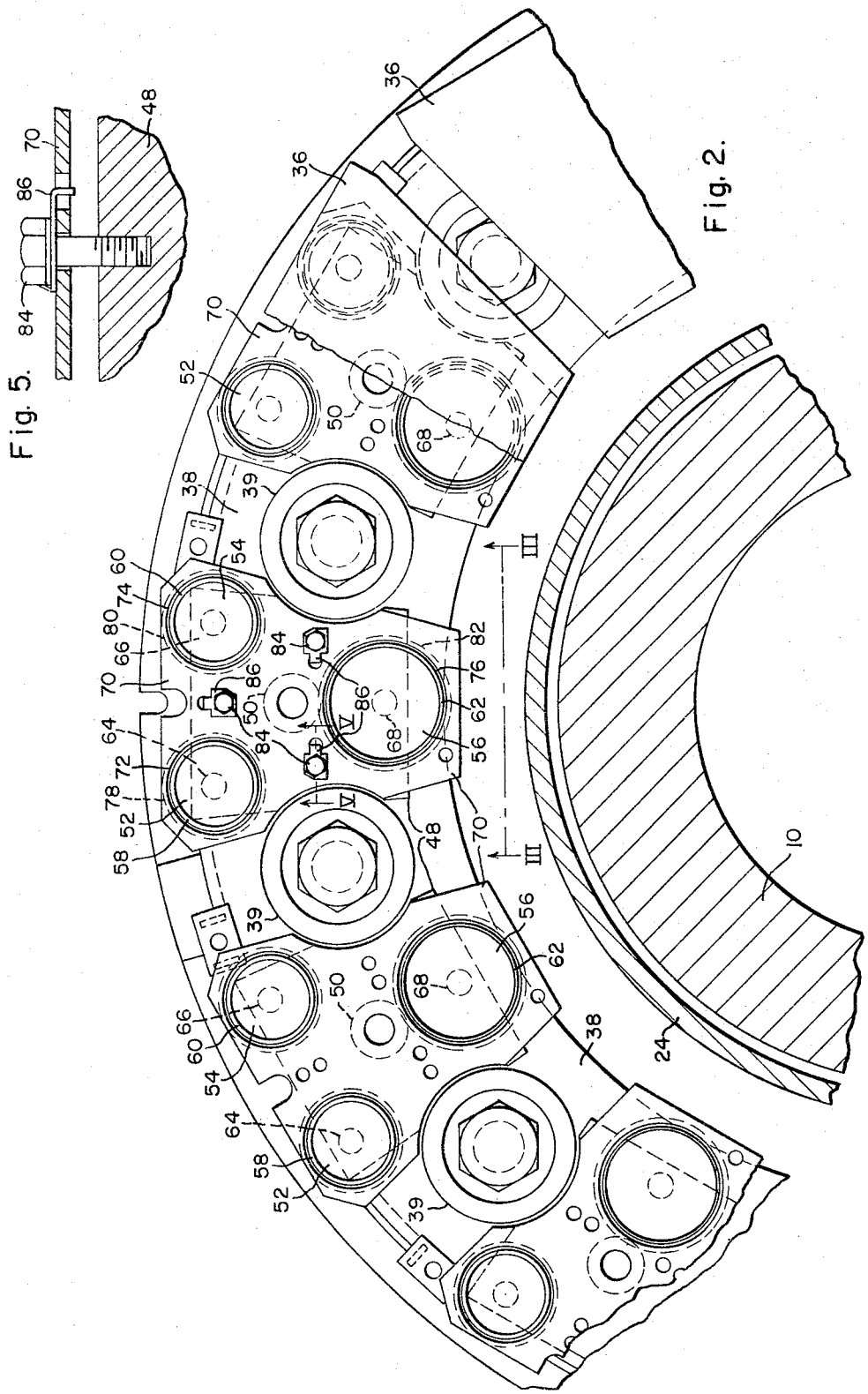
FIG. 2 shows a partial plan view of the thrust bearing shown in FIG. 1 with some of the bearing pads removed and it is taken along the reference line II—II in FIG. 1.

As observed in FIG. 2, each bearing pad 36 generally has an outer contour equivalent to that of an arcuate segment of a flat annular ring member. A single pivot support 40 (FIG. 1) is provided for each bearing pad 36 on end portion 42 of a jackscrew assembly 44 which in turn is threadedly engaged in relation to the annular support member 38. The principal purpose in providing the pivot support 40 on the jackscrew assembly 44 is to provide for adjustment in the elevation of the associated bearing pad 36 and thus the extent to which each bearing pad 36 is loaded (preferably equally) during machine operation.

As previously noted, it is preferable that machine loading on the bearing pads 36 be substantially uniformly distributed over the respective bearing pad surfaces 34 so as to prevent shortening of bearing life due to excessive peak loading on any one portion of the bearing pad surface 34. Although bending of the bearing pad 36 in the circumferential direction is desirable to some extent during machine operation so as to promote lubrication of the bearing surfaces 32 and 34, bending in other directions, particularly in the radical or near radial direction, is generally undesirable. With the large bearing pad sizes needed for large machines, undesired bending of the bearing pad 36 about the single pivot support 40 becomes facilitated because the pad periphery then tends to bend down more relative to the pad center unless the supporting structure for the bearing pad 36 on the pivot support 40 is arranged to support the pad 36 against the undesired bending and thus for substantially uniform loading of its surface 34. (It is noted that the amount of bending involved in any event is relatively small, for example a displacement of say several mils for a bearing pad thickness of say 3.75 inches.)

Support means 46 for each bearing pad 36 on its pivot support 40 provide for substantially uniform loading and for this purpose include a spring steel plate 48 (FIG. 4) having a hardened steel insert 50 suitably secured therein at the center of loading of the plate 48 and supported on pivot support 40 of the jackscrew assembly 44 (FIG. 1). The bearing pad support means 46 further include three spring disc members 52, 54 and 56 which are supported on the spring plate member 48 and arranged as a stable three point support system to provide the desired uniformity of loading on the bearing pad surface 34.

Each spring disc member 52, 54 or 56 is provided with an annular upwardly extending flange 58, 60 or 62 which is provided with a bearing surface on which the underside of the associated bearing pad 36 is disposed. A lower stem portion 64, 66 or 68, of smaller diameter, is provided along the vertical axis of each disc 52, 54 or 56 and is supported on the upper surface of the spring plate 48. Since the annular bearing flange is disposed outwardly of the lower stem portion on each spring disc 52, 54 or 56 and since the thickness of base 61 of each disc is appropriately sized, spring support is achieved by the spring discs to the extent that downward bending of the annular outer portion of each disc occurs in relation to the associated stem portion. The disc stem portions 64, 66 and 68 further transmit force to the spring support plate 48 and also produce some spring bending of this plate during machine operation.

The spring discs 52, 54 and 56 are positioned by means of a retainer plate 70 which is provided with respective openings 72, 74 and 76 through which the annular flange bearing portions 58, 60 and 62 respectively project. The retainer plate 70 rests on respective horizontally extending flange portions 78, 80 and 82 of the spring discs 52, 54 and 56. The retainer plate openings 72, 74 and 76 thus are located in the retainer plate according to the placement determined for the spring discs 52, 54 and 56. As shown in FIGS. 2 and 5, a plurality of bolts and locking washers 86 can be employed to attach the retainer plate 70 to the spring plate 48.

To achieve substantially uniform load distribution over the bearing pad surface 34, the pad support means 46 are arranged such that the disc 56 is disposed radially inwardly of the discs 58 and 60. Preferably, the discs 58 and 60 are of identical size and are disposed along a common circumferential reference line about the machine shaft 10. Further, the disc 56 preferably is relatively larger than the discs 58 and 60 in radial extent so as to promote the desired bearing load uniformity on the bearing pad surface 34.

With the number of spring discs described and with the placement of such discs described efficient and economic support is provided for each bearing pad 36 relative to its pivot support 40. Thus, it has been determined that excellent bearing pad life can be expected with the arrangement since uniformity in loading on the bearing pad surface 34 is achieved to a favorable and substantial extent. Further, manufacturing economy is simultaneously achieved since a relatively small number of parts are needed to provide the disclosed interaction for efficient bearing pad support. More specifically, sufficient bending occurs in the circumferential direction to promote wedging oil entry between the bearing surfaces 32 and 34 in the manner previously described. Mechanical stability is provided in the support means 46 and sufficient spring support is provided through the interaction of the disc members 52, 54 and 56 and the spring plate 48 to provide sufficient bending of the bearing pad 36 for avoiding a flush locking fit between the bearing surfaces 32 and 34, yet the net effect of this spring support is such as to provide the desired loading uniformity on the bearing pad surface 34.

The foregoing disclosure has been presented only to illustrate the principles of the invention. Accordingly, it is desired that the invention be not limited by the embodiment described but, rather that it be accorded an interpretation consistent with the scope and spirit of its broad principles.

What is claimed is:

1. A supporting arrangement for a thrust bearing assembly having a plurality of segmental bearing pads circumferentially disposed and having respective bearing surfaces for supporting a rotating thrust runner of a vertical machine shaft, said supporting arrangement comprising for each of said bearing pads a spring plate disposed on a stationary pivot support substantially at its center of loading, three discs supporting the associated pad on said spring plate, means forming a part of each spring disc for characterizing the support of said pad relative to said spring plate with a given degree of spring response, one of said spring discs disposed radially inwardly of the other two spring discs so as to provide substantial uniformity of loading on the bearing surface of the associated bearing pad and so as to promote sufficient and appropriate pad bending for efficient bearing surface lubrication during machine operation, and means retaining said spring discs in the positions described.

2. A supporting arrangement for a thrust bearing assembly having a plurality of segmental bearing pads circumferentially disposed and having respective bearing surfaces for supporting a rotating thrust runner of a vertical machine shaft, said supporting arrangement comprising for each of said bearing pads a spring plate disposed on a stationary pivot support substantially at its center of loading, three discs supporting the associated pad on said spring plate, means forming a part of each spring disc for characterizing the support of said pad relative to said spring plate with a given degree of spring response, two of said spring discs disposed along a common circumferential line about said machine shaft and the other spring discs disposed radially inwardly of said two spring discs so as to provide substantial uniformity of loading on the bearing surface of the associated bearing pad and so as to promote sufficient and appropriate bearing pad bending for efficient bearing surface lubrication during machine operation, and means for retaining said spring discs in the positions described.

3. A supporting arrangement for a thrust bearing assembly having a plurality of segmental bearing pads circumferentially disposed and having respective bearing surfaces for supporting a rotating thrust runner of a vertical machine shaft, said supporting arrangement comprising for each of said bearing pads a spring plate disposed on a stationary pivot support substantially at its center of loading, three discs supporting the associated pad on said spring plate, means forming a part of each spring disc for characterizing the support of said pad relative to said spring plate with a given degree of spring response, two of said spring discs disposed along a common circumferential line about said machine shaft and the other spring disc being relatively larger in diameter than and disposed radially inwardly of said two spring discs so as to provide substantial uniformity of loading on the bearing surface of the associated bearing pad and so as to promote sufficient and appropriate bearing pad bending for efficient bearing surface lubrication during machine operation, and means for retaining said spring discs in the positions described.

4. A supporting arrangement for a thrust bearing assembly having a plurality of segmental bearing pads circumferentially disposed and having respective bearing surfaces for supporting a rotating thrust runner of a vertical machine shaft, said supporting arrangement comprising for each of said bearing pads a spring plate disposed on a stationary pivot support substantially at its center of loading, three discs each having an annular flange portion on which the associated bearing pad is disposed and further having a reduced diameter stem portion disposed on said spring plate so that the support of said bearing pad relative to such spring plate is characterized with a given degree of resiliency, two of said spring discs disposed along a common circumferential line about said machine shaft and the other spring discs being relatively larger in diameter than and being disposed radially inwardly of said two spring discs so as to provide substantial uniformity of loading on the bearing surface of the associated bearing pad and so as to promote sufficient and appropriate bearing pad bending for efficient bearing surface lubrication during machine operation, and a retaining plate secured to said spring plate and having respective openings through which said spring discs extend so that said spring discs are retained in the respective positions described.

References Cited by the Examiner

UNITED STATES PATENTS 3,018,144   1/1962   Baudry et al. _____ 308—160

FRANK SUSKO, *Primary Examiner.*